US010493683B2

(12) United States Patent
Siegl (10) Patent No.: US 10,493,683 B2
(45) Date of Patent: Dec. 3, 2019

(54) STRETCH BLOW MOLDING PROCESS (71) Applicant: ALPLA WERKE ALWIN LEHNER GMBH & CO. KG, Hard (AT)

(72) Inventor: Robert Siegl, Dornbirn (AT)

(73) Assignee: Alpla Werke Alwin Lehner GMBH & Co. KG, Hard (AT)

(*) Notice: Subject to any disclaimer, the term of this patent is extended or adjusted under 35 U.S.C. 154(b) by 78 days.

(21) Appl. No.: 15/514,810

(22) PCT Filed: Sep. 25, 2015

(86) PCT No.: PCT/EP2015/072120
§ 371 (c)(1),
(2) Date: Mar. 27, 2017

(87) PCT Pub. No.: WO2016/046371
PCT Pub. Date: Mar. 31, 2016

(65) Prior Publication Data
US 2018/0186056 A1 Jul. 5, 2018

(30) Foreign Application Priority Data
Sep. 25, 2014 (CH) ........................ 1454/14

(51) Int. Cl.
B29C 49/12 (2006.01)
B29B 11/14 (2006.01)
(Continued)

(52) U.S. Cl.
CPC .............. *B29C 49/12* (2013.01); *B29B 11/14* (2013.01); *B29C 49/6418* (2013.01);
(Continued)

(58) Field of Classification Search
CPC .... B29C 2049/1228; B29C 2049/1238; B29C 2049/1242
(Continued)

(56) References Cited

U.S. PATENT DOCUMENTS 4,128,383 A * 12/1978 Bond .................... B29C 49/58
425/529
4,403,940 A * 9/1983 Krishnamumar ....... B29C 49/58
425/529
(Continued)

FOREIGN PATENT DOCUMENTS

DE 3024283 2/1981
JP S4720855 11/1972
(Continued)

OTHER PUBLICATIONS

Nakamura, "Injection Stretch Blow Molding", Chapter 3, pp. 117-129, of "Blow Molding Handbook" edited by Rosato et al, Hanser publishers, 1988. (Year: 1988).*

Primary Examiner — Robert B Davis
(74) Attorney, Agent, or Firm — Morriss O'Bryant Compagni Cannon, PLLC (57) ABSTRACT A stretch blow molding process for producing a plastic container from a preform, having an elongated, tubular preform body, extending along a center axis. The first end of the preform body is closed by a preform bottom and the second end is adjoined by a neck part with a pouring opening. A wall, bounds an interior space of the preform. The preform body is heated and introduced into a cavity of a blow mold. A stretching mandrel enters the preform until the stretching mandrel tip reaches the preform bottom. The preform body and the preform bottom are stretched by the stretching mandrel. The preform body and the preform bottom are deformed by introducing a fluid into the preform under pressure. The stretching mandrel makes contact with the inner side of the wall in the region of the preform body.

25 Claims, 2 Drawing Sheets (51) Int. Cl.
| | |
|---|---|
| *B29C 49/64* | (2006.01) |
| *B29K 105/00* | (2006.01) |
| *B29B 11/08* | (2006.01) |
| *B29L 31/00* | (2006.01) |
| *B29C 49/00* | (2006.01) |
| *B29C 49/06* | (2006.01) |
| *B29C 49/02* | (2006.01) |

(52) U.S. Cl.
CPC ....... *B29B 11/08* (2013.01); *B29B 2911/1402* (2013.01); *B29B 2911/1404* (2013.01); *B29B 2911/14026* (2013.01); *B29B 2911/14033* (2013.01); *B29B 2911/1434* (2013.01); *B29B 2911/14326* (2013.01); *B29B 2911/14333* (2013.01); *B29B 2911/14426* (2013.01); *B29B 2911/14693* (2013.01); *B29B 2911/14913* (2013.01); *B29B 2911/14926* (2013.01); *B29C 49/0005* (2013.01); *B29C 49/06* (2013.01); *B29C 49/6454* (2013.01); *B29C 2049/024* (2013.01); *B29C 2049/1228* (2013.01); *B29C 2049/1238* (2013.01); *B29C 2049/1242* (2013.01); *B29K 2105/0094* (2013.01); *B29K 2995/0043* (2013.01); *B29K 2995/0064* (2013.01); *B29L 2031/716* (2013.01); *B29L 2031/7158* (2013.01)

(58) Field of Classification Search
USPC ........................................................ 425/529
See application file for complete search history.

(56) References Cited

U.S. PATENT DOCUMENTS

| | | | | |
|---|---|---|---|---|
| 4,422,843 | A * | 12/1983 | Aoki | B29C 49/00 264/532 |
| 4,437,825 | A * | 3/1984 | Harry | B29C 49/28 425/145 |
| 4,818,212 | A * | 4/1989 | Gibbemeyer | B29C 49/4205 264/531 |
| 4,880,593 | A | 11/1989 | Strassheimer | |
| 5,200,134 | A * | 4/1993 | Collombin | B29C 49/12 264/532 |
| 5,213,752 | A | 5/1993 | Miyazawa et al. | |
| 5,533,881 | A * | 7/1996 | Collette | B29C 49/54 264/516 |
| 5,585,066 | A * | 12/1996 | Weiss | B29C 49/42 264/526 |
| 7,862,327 | B2 * | 1/2011 | Rousseau | B29C 49/58 425/529 |
| 2004/0009257 | A1 * | 1/2004 | Galloni | B29C 49/12 425/529 |
| 2008/0257855 | A1 | 10/2008 | Patel | |
| 2008/0277840 | A1 * | 11/2008 | Yanagimachi | B29C 45/0055 264/519 |
| 2010/0316757 | A1 * | 12/2010 | Rymann | B29C 49/58 425/529 |

FOREIGN PATENT DOCUMENTS

| | | | | |
|---|---|---|---|---|
| JP | H05131528 | 5/1993 | | |
| JP | 2000246789 | 9/2000 | | |
| WO | WO-2013063453 A1 * | 5/2013 | ............ | B29C 49/12 |

* cited by examiner

STRETCH BLOW MOLDING PROCESS

CROSS REFERENCE TO RELATED APPLICATIONS

This application is a national phase entry under 35 U.S.C. § 371 of PCT/EP2015/072120 filed on Sep. 25, 2015, which claims priority to Swiss Patent Application No. 1454/14 filed on Sep. 25, 2014, the entirety of each of which is incorporated by this reference.

TECHNICAL FIELD

The invention relates to a plastic container and a two-step stretch blow molding process for producing such containers from preforms.

PRIOR ART

For packaging liquid foods and other pourable substances, for example, cleaning agents, body care agents, cosmetics, automotive media, etc., mainly containers made of plastic are used today. However, many conventional plastics gain their special properties only by means of stretching. For example, polyethylene terephthalate (PET) is a very popular plastic which achieves a strength level several times higher than that of unstretched PET only by stretching, and this influences the degree of crystallization. Bottle-shaped plastic containers in particular are therefore often produced in a so-called injection stretch blow molding process.

First, in an injection casting process, a preform is produced in an injection mold. The preform normally has an essentially elongated cylindrical body that is closed on one longitudinal end and is embodied with an opening on the other end. A supporting ring expediently separates the body from a neck part having a spout opening. The neck part may already have the subsequent shape of the neck of the bottle. A thread or some other means for fastening a container closure may be formed on the outside or inside of the neck part.

After it has been produced, the preform is unmolded and processed further immediately or stored temporarily for subsequent processing by a blow molding machine. Before further processing in a blow molding machine, the preform may be conditioned, if necessary. After this, it is introduced into a blow molding mold on the blow molding machine, where it is stretched using a stretching mandrel (which is also referred to as a "stretching rod," "stretching mandrel," "stretching ram" or "core rod") and blown by a gas injected into the preform in accordance with the mold cavity of the blow molding mold. After conclusion of the blow molding process, the finished plastic bottle can be unmolded. This second part of the injection stretch blow molding process is a stretch blow molding process.

In the present patent application, the second part of a so-called two-step injection stretch blow molding process (or synonymous: "two-step injection stretch blow molding process") will be discussed in detail. In the two-step injection stretch blow molding process, a preform is produced in the first step and then in the second step the preform is stretched and blow molded to form the bottle (stretch blow molding process), wherein the two steps in the two-step injection stretch blow molding process are carried out at separate locations and at separate times. In contrast with that, both take place together locally and chronologically in a so-called one-step injection stretch blow molding process (or synonymous: "one-step injection stretch blow molding process"), i.e., production of the preforms and the bottle in the same machine (the preform is not cooled completely; only cooled from the injection temperature, which is usually approx. 270° C., to the blow molding temperature, which is approx. 100° C.).

For the sake of thoroughness, it should be pointed out that, in addition to the injection stretch blow molding process, blow molding processes in which a slight stretching and blow molding take place immediately following injection of the preform are also known. In such processes, the preform remains on the injection core which at the same time forms a type of stretching mandrel. This resembles the one-step injection stretch blow molding process, but the longitudinal stroke of the injection core is usually only a few millimeters. Since the preform is stretched only slightly here, we are speaking of the so-called injection blow molding process, in contrast with the injection stretch blow molding process, which is of interest in conjunction with the present invention. In the known injection blow molding process, the preform comes in contact with the injection core.

In the two-step injection stretch blow molding process, preforms are stretched to a much greater extent in blow molding than in injection blow molding; for example, in the case of PET preforms, they are stretched to two to five times the diameter and two to five times the length. The stretching and blow molding of the preform in the two-step injection stretch blow molding process are carried out on a different machine than production of the preform, i.e., the injection molding process, and there is usually intermediate storage of the preform, so the preform cools down between the injection molding process and the stretching and blow molding, namely to at least room temperature. However, in order to be able to be stretched, the preform must be softened, which is achieved by prior heating of same in an oven. The stretching process is carried out by the blow molding process, on the one hand, and by the stretching mandrel, on the other hand.

The stretching mandrel is inserted through the opening in the preform and into the preform, which is in the blow molding mold, until it reaches the closed end, i.e., the bottom of the preform. The movement of the stretching mandrel is continued, so that pressure is exerted on the bottom and the preform is stretched (shaped) in length until it reaches the wall of the blow molding mold. Due to this deformation, the preform becomes longer, but it is smaller in diameter. Since the contact with the stretching mandrel is desired only in the bottom area, at the same time a small amount of air is injected, countering this contraction and largely preventing contact and cooling of the preform with the stretching mandrel in the body area. Injection of this small amount of air is usually referred to as the so-called preliminary blowing. Next there is the actual blowing ("main blowing") as described above.

If, on insertion, the stretching mandrel has already come in contact with the inside wall of the preform laterally in the area of the body, this area will cool rapidly at the contact point, which can result in rupture of the preform or to an irregular distribution of wall thickness in the blow molded container because the cooler contact point cannot be stretched to the same extent. This problem is reinforced by the fact that, after passing through the oven, the preform is soft and is never positioned entirely accurately after being introduced into the blow molding mold. As a rule, the preform will sit in a slightly skewed position in the blow molding mold or will not be centered ideally or may even be curved. There is also the possibility that the stretching mandrel is not positioned ideally centrally or is slightly shaped.

Preforms with a diameter of approx. 2 centimeters are generally used for bottles with a capacity of one-half liter, which may have a diameter of approx. 6 centimeters. Such a diameter allows a sufficient distance between the stretching mandrel and the inside wall of the preform on insertion of the stretching mandrel, so that the problems described above involving local contact do not occur. With the smaller bottles of 100 or 200 milliliters, for example, the diameter of the bottles and thus also the diameters of the preforms from which they are produced are much smaller. Accordingly, the opening through which the stretching mandrel is inserted or at least the inside diameter of the body of the preform is smaller.

If the opening in the preform or the inside diameter of the body of the preform has a diameter of less than 1 centimeter, the result is extensive problems with the mechanical engineering. In other words, if the diameter of the stretching mandrel is only slightly smaller than the inside diameter of the preform, then, when the stretching mandrel is inserted, there will be contact and therefore local cooling of the preform, with the consequences described above. However, if the diameter of the stretching mandrel is much smaller than the inside diameter of the preform, then the stretching mandrel will no longer be able to withstand the forces that occur during stretching and will bend or even break. Furthermore, there is the risk that because of its small diameter it will puncture the bottom of the preform, which will make stretching impossible.

Advantages of the Invention

One advantage of the present invention is to supply plastic containers with a small capacity that have been strengthened by stretching, at least in some areas, and are less permeable with respect to $CO_2$ (improved $CO_2$ barrier) than comparable containers of the same size.

In addition, a stretch blow molding process which is suitable in particular for processing preforms with a small inside diameter and/or for producing the containers described here is to be proposed.

As an additional goal, the stretch blow molding process should permit greater stretching of the preform, which would have a positive effect on the properties of the container produced therefrom and would make it possible to supply materials, which would not be suitable for such a process until then because of their delayed strengthening by stretching in their stretching process.

Additional advantages and goals of the present invention are derived from the following description.

DESCRIPTION OF THE INVENTION

This advantages are achieved by a container and a blow molding process according to the present invention.

A plastic container produced by a two-step blow molding process from a preform (as an intermediate) is disclosed among other things. The plastic container has a neck part with a spout opening, a container bottom, a container body extending between the neck part and the container bottom and a wall with an inside and an outside. The inside borders a volume greater than 50 milliliters and less than 400 milliliters, wherein the wall is strengthened by stretching in at least some areas, wherein the density of the material of the wall is higher by an average of at least 0.02 $g/cm^3$ due to the stretch strengthening in the area of the container body than the density of the material of the wall in the area of the neck part. It is desirable here if the plastic container has essentially no spherulitic crystallinity.

In addition, a stretch blow molding process for producing a plastic container from a preform is also disclosed. The preform has an elongated, especially essentially tubular body of the preform, which extends along a central axis of the preform and has a first end and a second end that is essentially opposite the first end. The first end is closed by a bottom of the preform and a neck part with a spout opening is connected to the second end. Furthermore, the preform has a wall bordering an interior space of the preform, wherein the wall has an inside and an outside. This method provides that the body of the preform is heated to at least 70° C.,
the preform is introduced into a cavity in a blow molding mold,
a stretching mandrel, which has a stretching mandrel body and a stretching mandrel tip, is inserted into the preform until the stretching mandrel reaches the bottom of the preform,
the body of the preform and the bottom of the preform are stretched into the cavity by the stretching mandrel,
the body of the preform and the bottom of the preform are shaped under pressure in accordance with the cavity by introducing a fluid into the preform, and
the stretching mandrel comes in contact with the inside of the wall in the area of the body of the preform in at least one predetermined partial area while it is being inserted into the preform until it reaches the body of the preform.

Features are described below which are to be considered (individually) as desired features even if they are not explicitly referred to as such. These features are disclosed separately (as part of any plastic container, any preform or any stretch blow molding process) and—inasmuch as they are not mutually exclusively—are disclosed in any combination. This includes the possibility of simultaneous implementation of all the features described.

Unlike the known stretch blow molding processes, no attempt is made to prevent contact of same with the inside of the body of the preform at the sides during contact of the stretching mandrel. Instead, a uniform contact and thus a uniform change in temperature of the inside of the body of the preform as a result of contact with the stretching mandrel is the goal. Since the stretching mandrel can extend as far as the inside of the wall of the preform in the area of the body of the preform during insertion, the problems described above with regard to its stability and the possibility of puncturing the bottom of the preform are solved.

There is the possibility of using small thin preforms, which can be stretched to a greater extent at the same size of the plastic container to be produced. Therefore, plastic containers having adequate stretching strength despite their small size can be produced.

For use in a stretch blow molding process and/or for producing plastic containers such as those described in this document, any desired preforms may be used, but they should have one or more of the features of a preform such as those described in this document. Preforms such as those disclosed in the patent application bearing the title "Preforms and Methods for Producing Preforms," which has the same filing date as the present patent application, are especially desirable for use in a stretch blow molding process and/or for production of plastic containers, such as those described in this document. In addition, such preforms may optionally also have features of a preform such as those described in the present document. The contents of said patent application shall therefore be regarded as part of the content of the present patent application.

By means of a greater stretching, improved barrier properties can be created in the plastic container, in particular with respect to $CO_2$. The susceptibility to stress cracking is reduced and a greater strength is achieved. The containers produced in this way can be designed more easily because of their increased strength at the same size.

The change in the imperviousness of the material can be used as a measure of the stretching because the crystallinity of the stretched material is increased due to this stretching and an increased crystallinity is associated with an increased material density. It is provided that the material density of the ball in the area of the container body is greater on average by at least 0.02 g/cm³ (grams per cubic centimeter) in the area of the container body than the material density of the wall in the area of the neck part, where this difference in the material density is created essentially due to the stretching of the material of the wall. This is also true of alternative values for the difference mentioned further below.

The plastic container may have essentially no spherulitic crystallinity, wherein the spherulitic crystallinity of the plastic container and/or the wall in the area of the neck part and/or the wall in the area of the container body may amount to less than 5 or 3%. A spherulitic crystallinity differs from crystallinity created by stretching a material. A spherulitic crystallinity can be created, for example, by deforming a preform by insertion into a hot cavity.

It is known from the prior art that containers having a small volume, for example, 0.33 liter, have a pore barrier against the loss of $CO_2$ from container contents comprising carbonic acid. The loss of $CO_2$ consists of permeation of $CO_2$ through the wall of the container and through the $CO_2$ which escapes due to creep (deformation) of the container and the associated increase in the volume of the container. On the one hand, due to the stretch strengthening, the creep of the plastic is reduced under the influence of the internal pressure of the container, which depends on the $CO_2$ content, among other things. On the other hand, the stretch strengthening increases the $CO_2$ barrier regardless of the thickness of the container wall and thereby reduces permeation. This makes it possible to design the container wall to be thinner, which makes such containers lighter.

The creep of the container material can be observed with the following test arrangement: the plastic container is filled with water which contains $CO_2$ in an amount of 8 grams per liter (g/L). Next it is stored for 24 hours in a climate chamber in which a temperature of 22° C. and the relative atmospheric humidity of 50%. With a plastic container described in this document, the increase in volume during 24 hours may amount to less than 5%.

The plastic container has a wall with an inside and an outside. It is possible to provide that the inside borders a volume, which is less than 300, 200 or 100 milliliters and/or the plastic container has such a volume.

The plastic container may consist essentially of the wall and/or the wall is the plastic container. If there should be any lack of clarity here, then when parts of the plastic container (e.g., neck part, container body, container bottom) are mentioned in this document (unless otherwise indicated or otherwise suggested by the context), the wall of the plastic container in the area of some part is intended.

Unless otherwise indicated or suggested by the context, the finished plastic container is meant (referring to the plastic container).

A preform which is suitable for producing the plastic container may have an elongated tubular body of the preform, which extends along a central axis of the preform and has a first end (in particular a longitudinal end) and a second end (in particular a longitudinal end) that is essentially opposite the first end. The first end is closed by a bottom of the preform and a neck part with a spout opening is connected to the second end. The preform has a wall which borders an interior space of the preform wherein the wall has an inside and an outside.

The preform may consist essentially of the wall and/or the wall is the preform. If anything is unclear, then when parts of the preform (e.g., neck part, body of the preform, bottom of the preform) are mentioned in this document (unless otherwise indicated or otherwise suggested by the context), then the wall of the preform in the area of said part is what is intended, such as in the as yet unstretched state of the preform, unless something to the contrary is indicated.

The preform may optionally have a supporting ring between the neck part and the body of the preform.

According to one variant, a first central peripheral surface extends centrally between the inside and the outside of the wall of the preform in the area of the body of the preform, wherein a first distance (shortest distance) between the central axis of the preform and a point situated on the first central peripheral surface at the greatest distance away from the central axis of the preform. In addition, it is provided with this variant that the container body extends along a central axis of the plastic container, wherein a second central peripheral surface extends centrally between the inside and the outside of the wall of the plastic container in the area of the container body, wherein a (shortest) second distance between the central axis of the plastic container and the point on the second central peripheral surface situated the greatest distance away from the central axis of the plastic container. The variant described here is then characterized in that the ratio of the second distance to the first distance is greater than 3.8 and/or less than 6.

The central peripheral surfaces described here are only position references. These are not structures situated at the center of the wall of the preform or of the wall of the plastic container.

It is advantageously possible to provide that (A) the maximum circumference (i.e., the circumference at the site of the largest circumference) or the average circumference of the wall of the plastic container in the area of the container body and (B) the maximum circumference (i.e., the circumference at the site of the largest circumference) or the average circumference of the wall of the preform in the area of the body of the preform form a ratio (A/B), which is greater than 3 or 3.8 or 4.5 and/or less than 8 or 6 or 5.

The density of the material of the plastic container may be higher on the average by at least 0.02 or 0.03 or 0.04 g/cm³ than the density of the material of the preform of which it is made.

A measurement of the material density can be carried out according to the standard test method ASTM D1505-10 (source: ASTM International, 100 Barr Harbor Drive, P.O. Box C700, West Conshohocken, Pa. 19428-2959, USA).

The plastic container and/or the preform of which the plastic container is produced may consist of and/or contain essentially of one or more materials.

The one or more materials may include, for example, polymers, which advantageously belong to the group of polyesters, polyamides or polyolefins.

The polymers may be produced, for example, entirely or partially from crude oil and/or biological raw materials, in particular plants that are renewable (such as within less than 1000 years).

Desired polymers include PET (polyethylene terephthalate), PEF (polyethylene furanoate), PEN (polyethylene naphthalate), PA (polyamide), PS (polystyrene), HDPE (high-density polyethylene), LDPE (low-density polyethylene) and PP (polypropylene).

The plastic container and/or the preform of which it is produced may essentially be made of a material, said material may be PET or PEF.

The intrinsic viscosity (IV) of the material may advantageously be greater than 0.77 or 0.8 dL/g and/or less than 0.90 or 0.84 dL/g, wherein 0.8 to 0.84 dL/g is especially desired.

A measurement of the intrinsic viscosity (IV) can be carried out, for example, according to the standard test method ASTM D4603 (source: ASTM International, 100 Barr Harbor Drive, P.O. Box C700, West Conshohocken, Pa. 19428-2959, USA).

Although PET is described as a desired material, the present invention can make it possible to solve the problems described above regarding the stretching mandrel that is too thin and therefore too unstable by using materials that require even higher stretching ratios than PET.

The stretch blow molding process may be used to produce a plastic container such as that described in this document and/or such a plastic container may optionally be produced with said stretch blow molding process.

The stretch blow molding process may be a stretch blow molding process in which a preform produced by an injection casting process, after which it is cooled (such as to room temperature) and optionally stored temporarily. In such a process the preform must be heated first before being processed further in a blow molding mold to form the plastic container. The stretch blow molding process may be carried out by a different machine than the production of the preform, i.e., the injection casting process.

This production process (injection stretch blow molding process) including the production of the preform is thus advantageously a two-step injection stretch blow molding process.

It is provided that in the stretch blow molding process, the preform is heated, such as from the outside.

The heating may take place, for example, by infrared radiation (in particular near-infrared radiation) or contact heat. If in conjunction with the stretch blow molding process, heating or heat of the preform is mentioned, however, this explicitly does not refer to the residual heat from the injection molding, which plays a role in the one-step process.

The preform is expediently heated in an oven and/or outside of the blow molding mold.

Before heating, the preform may have an average temperature of less than 60° C., 40° C. or 30° C. In other words, it is desirable for the process to use preforms which have been largely cooled after their production (cf. values given above) and optionally stored temporarily for at least 15 minutes in the cooled state, which is not the case in the one-step process (one-step injection stretch blow molding process), which is not the subject matter of the present invention and in which the injection and stretch blow molding are carried out in the same machines.

The preform and/or the body of the preform may be heated as part of the proposed stretch blow molding process, until reaching an average temperature of more than 70° C. or 80° C. Alternatively or additionally, the preform and/or the body of the preform may be heated until they have an average temperature at least 10° C., 30° C. or 40° C. above the glass transition temperature of the material of which it is essentially made. Heating results in plastic deformation of the preform. As described above, desired groups of materials include polyesters, polystyrenes and polyamides, for example. In the case of polyolefins (e.g., PE or PP), the glass transition temperature is very low, sometimes lower than 0° C., but nevertheless, these can usually undergo plastic deformation very well only in proximity to the melting point. If the material of the preform is a polyolefin, then the preform and/or the body of the preform are therefore advantageously heated to a temperature of 5° C. to 50° C. below the melting point of the material.

After heating of the preform and/or on insertion of the stretching mandrel into the preform, the preform may have a temperature that is higher on the inside of the wall by at least 5° C., 10° C., 15° C. or 18° C., in particular in the area of the body of the preform, than the temperature on the outside of wall, in particular in the area of the body of the preform. It is possible in this way for the preform to remain plastic despite the contact with the stretching mandrel and the associated cooling, and it can be stretched and blow molded in the stretch blow molding process. This can be achieved, for example, by cooling the preform during the heating only or at least to a greater extent on its exterior side due to air convection with fans. Optionally due to the oven structure, it is possible to achieve a circulation that does not allow a certain heat loss to take place over the inside of the preform or allows this only to a lesser extent than that over the outside of the preform. Thus, the overheating on the inside reduces the risk that blow molding of the preform will be made difficult or even impossible because of the cooling due to the contact with the stretching mandrel.

According to one expedient variant, it is provided that the inside of the wall, in particular in the area of the body of the preform, has a temperature of at least 100° C. after being heated.

If the material of the preform is a polyester, then the preform may have a temperature of more than 100° C., 110° C. or 115° C. and/or less than 180° C., 170° C. or 160° C. on the inside of the wall, in particular in the area of the body of the preform. A temperature of 100° C. to 150° C. is especially desirable if the preform is made of PET, and a temperature of 105° C. to 155° C. is desired if the preform is made of PEF.

It may be provided that the stretching mandrel is heated outside of the blow molding mold before being inserted into the preform, by being heated to a temperature of at least 80° C., ideally to 10° C. above the glass transition temperature in the case of a polyester.

After heating the preform, the preform is inserted into the cavity of a blow molding mold. The shape of the cavity defines the shape of the plastic container to be produced from the preform. The blow molding mold usually has an opening leading into the cavity, where the preform is positioned in this opening. The closed end (first end) of the body of the preform protrudes into the cavity or at least faces the cavity. The spout opening of the preform is printed outward and is therefore accessible for the stretching mandrel.

The stretching mandrel is inserted into the preform through the spout opening in the preform until it reaches the bottom of the preform, which is opposite the spout opening. The stretching mandrel has a stretching mandrel body and a stretching mandrel tip, wherein the stretching mandrel tip comes into contact with the bottom of the preform when the stretching mandrel reaches the bottom of the preform.

It is provided that, while being introduced into the preform, the stretching mandrel comes in contact with the inside of the wall of the preform in the area of the body of the preform in at least one predetermined partial area. In the injection blow molding process according to the prior art, as described further above, there is no insertion of the stretching mandrel in the sense of the present invention. In the injection blow molding process, the preform remains on the injection core, which can be displaced slightly in the direction of the blow molding bottom for completion of the bottle.

According to one variant, the stretching mandrel comes in contact with the inside of the wall in the area of the body of the preform while it is being inserted into the preform, wherein an essentially uniform heat exchange takes place over the circumference between the aforementioned inside and the stretching mandrel. The aforementioned circumference is the inside circumference of the body of the preform described below and/or the (outer) circumference of the stretching mandrel in the area of the stretching mandrel body.

It is advantageous if the stretching mandrel and the preform come in contact over a length of at least 20 millimeters, or at least 30 millimeters (measured along the central axis of the preform) while the stretching mandrel is being inserted into the preform.

While the stretching mandrel is being inserted into the preform, it may come in contact with the preform along an internal circumference of the body of the preform and/or along an (external) circumference of the stretching mandrel in the area of the stretching mandrel body. The inside circumference of the body of the preform is defined by a line along the inside of the wall of the preform in the area of the body of the preform, wherein the line lies in a plane arranged at a right angle to the central axis of the preform. The (outside) circumference of the stretching mandrel is defined by a line along the outside of the stretching mandrel in the area of the stretching mandrel body, wherein the line lies in a plane arranged at a right angle to the central axis of the stretching mandrel.

The stretching mandrel advantageously comes in contact with the preform essentially along the entire inside circumference (or at least most of it) of the body of the preform and/or at regular intervals along the inside circumference of the body of the preform while it is being inserted into the preform.

It is desirable if the stretching mandrel, while it is being inserted into the preform, comes in contact with the preform essentially along the entire outside circumference of the stretching mandrel (or at least the largest portion thereof) and/or at regular intervals along the outside circumference of the stretching mandrel.

The stretching mandrel, while it is being inserted into the preform, may come in contact with the preform at several locations (e.g., 2, 3, 4 or more) along the (outside) circumference of the stretching mandrel and/or along the inside circumference of the body of the preform.

According to one variant, the places where the stretching mandrel comes in contact with the preform may move along the inside of the wall of the preform while the stretching mandrel is being inserted (with constant contact between the stretching mandrel and the preform) in parallel with the central axis of the preform.

The stretching mandrel while it is being inserted into the preform may come in contact with the inside of the wall of the preform and the area of the body of the preform at two locations which are essentially opposite one another with respect to the central axis of the preform.

According to one variant, it is possible to provide that the stretching mandrel body has an outside with an outside contour (three-dimensional surface structure) which is designed so that the inside of the wall of the preform is contacted by the outside of the stretching mandrel body in the area of the body of the preform in at least two opposing partial areas extending essentially along the central axis of the preform and opposite one another essentially opposite one another with respect to the central axis of the preform while the stretching mandrel is being inserted into the preform.

The stretch blow molding process may advantageously be characterized in that the outside of the stretching mandrel, in particular in the area of the stretching mandrel body or the inside of the wall of the preform in the area of the body of the preform has webs running along the direction of insertion, establishing the contact between the stretching mandrel and the preform while the stretching mandrel is being inserted.

There is the possibility that the inside of the wall of the preform is heated or cooled locally by contact with the stretching mandrel, depending on the temperature of the stretching mandrel, at the locations where the inside of the wall comes in contact with the stretching mandrel on insertion. For example, this makes it possible to create a wall thickness profile for the plastic container to be produced, having either planned thick and thin locations in the axis of round bottles or having a uniform wall thickness distribution characteristic of an oval bottle.

According to one variant, the stretching mandrel comes in contact with the inside of the wall in the area of the body of the preform over at least 30%, 50% or 70% of its area and/or it essentially completely fills up the body of the preform at the point in time when it reaches the bottom of the preform.

It may also be expedient if the stretching mandrel, while it is being inserted into the preform, cools the inside of the wall in the area of the body of the preform at the contact points (i.e., in the locations where the stretching mandrel comes in contact with said inside) to a temperature between 0 and 40° C. above the glass transition temperature of polyesters, polyamides and polystyrene, and/or in the case of polyolefins, cools it to a temperature between 0 and 50° C. below the melting point.

It is possible to provide that the stretching mandrel extends along the central axis of the stretching mandrel and the extent of the stretching mandrel body at a right angle to the central axis of the stretching mandrel is at least as great as the circumference of the interior space of the preform at a right angle to the central axis of the preform in an area of the body of the preform connected to the body of the preform (in the unstretched state of the preform). Said extent of the interior space is advantageously less than 7 millimeters, less than 6 millimeters or less than 5 millimeters or 3 to 4 millimeters.

Alternatively or additionally, there is an (outer) circumference of the stretching mandrel (cf. definition further above) and an inner circumference of the body of the preform (cf. definition further above), so it holds that the cross-sectional area of the stretching mandrel defined by the aforementioned (outer) circumference of the stretching mandrel amounts to more than 90%, 100% or 102% of the inner cross-sectional area of the preform as defined by said inner circumference of the body of the preform.

Said (outer) circumference and/or said cross-sectional area of the stretching mandrel may not be as far removed from the tip of the stretching mandrel as said inner circumference and/or said inner cross-sectional area of the preform from the inside of the preform bottom.

According to one variant, the two points on said cross-sectional area of the preform the greatest distance apart from one another and/or the two points of said cross-sectional area of the stretching mandrel are less than 7, 6 or 5 millimeters apart from one another. Alternatively or additionally, said cross-sectional area of the preform and/or said cross-sectional area of the stretching mandrel may be less than 40, 35 or 30 square millimeters (mm²).

It is possible to provide that while the stretching mandrel is being inserted into the preform, it widens the body of the preform due to contact with it and/or increases the (inside and/or outside) circumference of the body of the preform (for example, by at least 2%, 5% or 10% and/or increases the interior space of the preform (for example, by at least 2%, 5% or 10%).

Alternatively or additionally, it is possible to provide that the stretching mandrel while being inserted into the preform, increases the length of the preform (measured along the central axis of the preform) (for example, by at least 1%, 2% or 5% and/or at most 20% or 10%). Due to the fact that the stretching mandrel comes in contact with the preform before the stretching mandrel reaches the bottom of the preform, it can in simplified terms "entrain" the preform.

According to one specific embodiment, the cross-sectional area of the interior space of the preform in the area of the body of the preform is 0.5% to 5% smaller than the cross-sectional area of the stretching mandrel and of the preform, while the stretching mandrel is being inserted into the preform, is expanded, namely in both diameter and length. Therefore, the preform is shaped already before the actual stretching process and the molecules are already aligned. In this case, one can speak of a minor prestretching.

To differentiate the individual process steps, it should be pointed out that when it is mentioned in this document that the stretching mandrel is inserted into the preform, this should be understood to refer to the insertion of the stretching mandrel into the preform until reaching the bottom of the preform, i.e., until the tip of the stretching mandrel has come in contact with the bottom of the preform. When it is mentioned that the body of the preform and the preform bottom are stretched (into the cavity) by the stretching mandrel, this therefore also refers to further insertion of the stretching mandrel into the cavity, i.e., starting at the point in time when the tip of the stretching mandrel has reached the bottom of the preform. Reaching the bottom of the preform thus marks the transition from "insertion" to "stretching."

According to a one embodiment, the preform mentioned above is a preform in the condition when the stretching mandrel is inserted into the preform.

The body of the preform may be essentially cylindrical, in particular a circular cylinder shape. A supporting ring may optionally be provided in the transitional area from the body of the preform to the neck part.

According to one variant, the preform may have at least 2, 4 or 8 webs on the inside of the wall, in particular in the area of the body of the preform, these webs running along the central axis of the preform and may be arranged uniformly along the inside circumference of the preform.

It is also possible to provide for the stretching mandrel and/or the stretching mandrel body to have at least 2, 4 or 8 webs on its outside, these webs running along the central axis of the stretching mandrel and may be arranged so they are distributed uniformly along the (outer) circumference of the stretching mandrel.

The stretching mandrel while being inserted into the preform, enters the area of the body of the preform by way of the webs in contact with the inside of the wall, while the areas between the webs do not come into contact with the preform. Such an embodiment may serve, for example, to reduce the heat transfer between the preform and the stretching mandrel.

The stretching mandrel may have a thermally-insulating and/or heat-reducing layer on its outside.

The adhesion-reducing layer expediently has a lower coefficient of adhesive friction and/or a lower sliding friction coefficient than said outside of the stretching mandrel without said adhesive-reducing layer. The adhesion-reducing layer may be present in solid form, such as in the form of a Teflon layer. However, there is also the possibility that the adhesion-reducing layer will be present in liquid form, such as a lubricant (e.g., a lubricant such as oil or grease). The lubricant may optionally be applied and/or replaced during the process, as by regular intervals or after each blow molding operation. Such an adhesion-reducing layer can facilitate the penetration of the stretching mandrel into the preform.

The heat-insulating layer is expediently designed to reduce the transfer of heat between the stretching mandrel and the preform. The heat-insulating layer therefore has a lower thermal conductivity than said exterior side of the stretching mandrel without said heat-insulating layer. Such a layer can reduce the cooling of the preform due to contact with the stretching mandrel.

The heat-insulating layer just described may also be an adhesion-reducing layer at the same time.

The preceding description may also apply in particular to the portion of the stretching mandrel being inserted into the preform and/or the body of the preform.

It is possible to provide that the stretching mandrel is heated before being inserted into the preform. This makes it possible to reduce the heat loss by the preform on coming in contact with the stretching mandrel can be reduced.

When carrying out the process, it is also possible to heat the stretching mandrel before inserting it into the preform, in which case no such heating is carried out before insertion into the preform in the case of an optional run of the process immediately prior to this and/or an optional run of the process immediately thereafter.

If the process is carried out several times in direct succession, the stretching mandrel can also be heated each time the process is carried out before it is inserted into the preform or it may be heated only the last time the process is carried out. In the latter case, it is possible that with one or more subsequent performances of the process, the stretching mandrel may be heated by contact with the heated preform. In this way, it is not necessary to heat the stretching mandrel again before inserting it into the preform.

The preform is inserted through the stretching mandrel into the cavity, as far as the inside wall of the cavity which is opposite the opening in the blow molding mold.

It is not absolutely necessary in this process for the preform to be preblown during stretching in order to prevent the stretching mandrel from coming in contact with the preform on one side because the stretching mandrel is already in contact with the preform.

In addition, however, it may be reasonable to preblow the preform, wherein a portion of the preform is released from the stretching mandrel due to the preliminary blowing, wherein a portion of the body of the preform remains in contact with the stretching mandrel, while the body of the preform and the bottom of the preform are stretched into the cavity by the stretching mandrel, specifically if a portion of the preblown form should become cooler on the blow molding mold at an early point in time to achieve a special wall thickness distribution in the plastic container to be produced and/or if a portion of the preblown form should crystallize on a very hot blow molding mold in order to achieve a special crystallization at the location in question.

The preliminary blowing (while the preform is being stretched by the stretching mandrel into the cavity) and the (main) blowing described here (after stretching and/or after the stretching mandrel has been inserted completely into the cavity and/or as far as the inside wall of the cavity) are not necessarily bound to introduction of a fluid through the blowing nozzle in the present case, which is usually not a part of a stretching mandrel. The preform can be cooled locally in a targeted manner by the fluid coming out through holes in the stretching mandrel and thereby thin and thick areas can be created in a targeted manner on the plastic container to be produced.

The tip of the stretching mandrel may travel a distance amounting to more than 10, 15 or 20 millimeters and/or less than 300, 250 or 200 millimeters while the preform is being stretched into the cavity by the stretching mandrel.

It is desirable for the (internal and/or external) circumference of the body of the preform not to decrease while the preform is being stretched by the stretching mandrel into the cavity.

After stretching and/or when the stretching mandrel has been completely inserted into the cavity and/or inserted as far as the inside wall of the cavity, the stretching mandrel body may be designed essentially as a cylinder at least up to the spout opening in the stretched preform.

After being stretched by the stretching mandrel, the preform is shaped according to the cavity by injecting a fluid (such as a gas such as air) into the preform ("(main) blowing"). This results in the plastic container that is to be produced and whose outer shape corresponds essentially to the shape of the cavity. Unless otherwise indicated or as indicated by the context, when speaking of introducing the fluid in this document, it is referring to this process step ("main blowing").

The fluid is introduced into the preform under pressure, wherein the pressure is greater than the pressure acting on the outside of the wall of the preform in the area of the body of the preform. In preliminary blowing, the pressure may be 1 to 10 bar, for example. In main blowing, the pressure may be 10 to 40 bar, for example.

According to one variant, the fluid may be introduced through the tip of the stretching mandrel.

It may be provided that the stretching mandrel body has at least one groove which extends essentially as far as the tip of the stretching mandrel or into the tip of the stretching mandrel, which is designed in such a way that the fluid can be introduced from the spout opening in the preform to the bottom of the preform when the stretching mandrel has stretched the body of the preform and the preform bottom into the cavity as far as the inside wall of the cavity.

Alternatively or additionally, a groove running on the outside of the stretching mandrel along the central axis of the stretching mandrel is provided in the area of the stretching mandrel body, such that the fluid is distributed through this groove from the preform bottom to the spout opening in the preform on introduction of the fluid into the preform.

The stretching mandrel may be embodied without any cooling passages and/or cavities. Alternatively, however, the stretching mandrel may also be hollow. The fluid can thus be conveyed through the cavity and into the stretching mandrel to the tip of the stretching mandrel and injected there into the preform, so that the preform can be blown to conform to the cavity.

The fluid introduced into the preform may be a gas, in particular air, injected into the preform.

After conclusion of the stretch blow molding process, the plastic container may be removed from the blow molding mold, so that the blow molding mold is ready to receive a new preform and to repeat the process steps.

The stretch blow molding process may be repeated one or more times, wherein a new preform is used each time the process is carried out.

The following are thus disclosed, among others:

(A) A plastic container produced by a two-step injection stretch blow molding process from a preform, having a neck part with a spout opening, a container bottom, a container body extending between the neck part and the container bottom and a wall having an inside and an outside, characterized in that the inside borders a volume that is greater than 50 milliliters and smaller than 400 milliliters, wherein the wall is strengthened by stretching in partial areas, wherein the density of the material of the wall in the area of the container body is on the average at least 0.02 g/cm$^3$ much greater than the density of the material of the wall in the area of the neck part as a result of this stretch strengthening operation, and wherein the plastic container essentially has no spherulitic crystallinity.

(B) The plastic container according to (A), characterized in that the inside borders a volume that is smaller than 300 milliliters, wherein a volume less than 200 milliliters and in particular less than 100 milliliters is desired.

(C) A plastic container according to (A) or (B), characterized in that the preform has an elongated tubular preform body extending along a central axis of the preform and having a first end and a second end essentially opposite the first end, wherein the first end is closed by a bottom of the preform and a neck part with a spout opening is connected to the second end and having a wall bordering an interior space of the preform with an inside and an outside, wherein a first central peripheral surface extends centrally between the inside and the outside of the wall in the area of the body of the preform, wherein a first distance extends between the central axis of the preform and a point situated the greatest distance away from the central axis of the preform and located on the first central circumferential surface, and the container body extends along a central axis of the plastic container, wherein a second central circumferential surface extends centrally between the inside and the outside of the wall in the area of the container body, wherein a second distance extends between the central axis of the plastic container and a point situated the greatest distance away from the central axis of the plastic container and located on the second central circumferential surface, wherein the ratio between the second distance and the first distance is greater than 3.8.

(D) A plastic container according to (A), (B) or (C), characterized in that it is made essentially of a material, wherein the material is PET or PEF.

(E) The plastic container according to (D), characterized in that the intrinsic viscosity (IV) of the material is greater than 0.77 dL/g and less than 0.87 dL/g measured according to ASTM D4603.

In addition, a stretch blow molding machine is disclosed, having a blow molding mold and a stretching mandrel. The blow molding mold has a cavity and an opening for receiving a preform, wherein the opening leads into the cavity.

The stretch blow molding machine may optionally be used to carry out the method described in this document and/or may have additional features of a stretch blow molding machine such as those described in this document.

If the presence of an object is mentioned in this document, this does not rule out the presence of additional objects of the same type. In other words, when an object is mentioned it should be understood to disclose "at least one" such object and "one or more" of such objects. One, two, three or more or even all of the additional objects may optionally have the same features as the one object.

If a statement regarding standard is not unambiguous, then the most up-to-date version of the standard at the point in time of the filing of the patent application is intended with the designation closest to the stated designation.

Actions disclosed in the form of suitabilities, capabilities, properties or functions of the apparatus described in this document (or portions thereof) shall also be disclosed (independently and in any combination) as process steps of the process, namely depending on and independently of the corresponding device or the corresponding device part.

Furthermore, the use of features of the devices or device parts described (independently and in any combination) shall also be considered as disclosed as process steps of the process.

Conversely, the devices or the device parts disclosed may have means which can carry out one or more of the process steps mentioned in conjunction with the process disclosed and/or are designed to do so.

Furthermore, each of the following patent claims, with a reference back to the respective one of the previous patent claims ("according to one or more of the preceding claims"), are also disclosed even if they are not claimed in this specific form.

BRIEF DESCRIPTION OF THE DRAWINGS

Shown in schematic diagrams, not drawn to scale.

EMBODIMENT OF THE INVENTION

Figure 1:
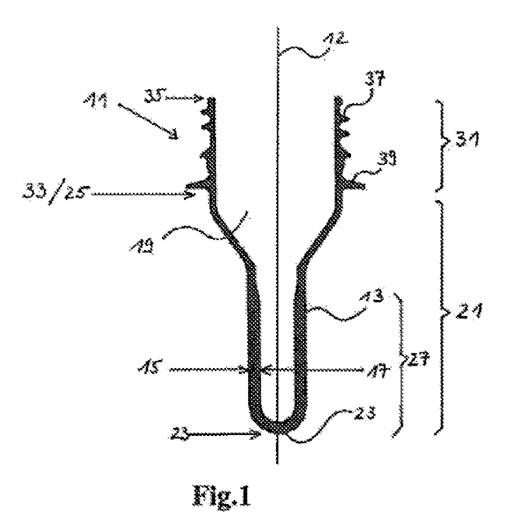
FIG. 1 shows a preform in a longitudinal section.
Figure 2:
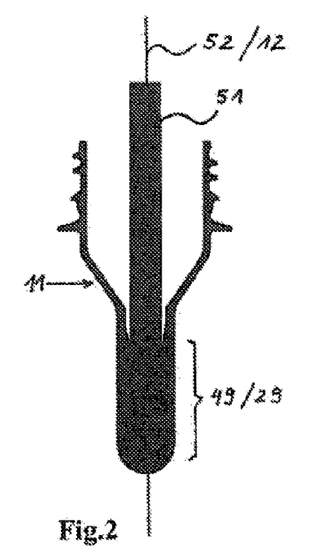
FIG. 2 shows the preform according to FIG. 1 with a stretching mandrel contacting the preform uniformly.
Figure 3A:
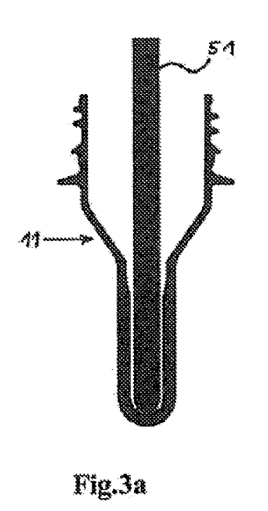
FIG. 3a shows the preform according to FIG. 1 with a stretching mandrel according to the prior art spaced a uniform distance away from the preform.
Figure 3B:
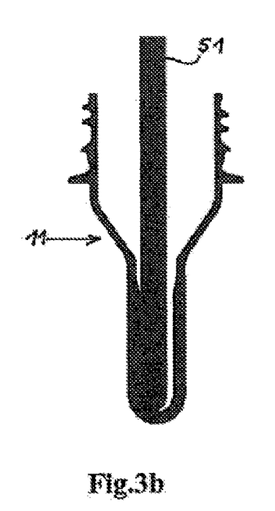
FIG. 3b shows the preform according to FIG. 1 with a stretching mandrel according to the prior art, contacting the preform irregularly.

The invention is explained as an example below on the basis of the drawings. FIG. 1 shows a preform which is designed to be processed further in a stretch blow molding process to form a plastic container. FIGS. 2, 3a and 3b show the preform from FIG. 1 as well as one stretching mandrel inserted into each preform and these figures are used to illustrate the stretch blow molding process.

With reference to FIG. 1, the preform 11 has a preform body 21 and a neck part 31 connected thereto. The central axis 12 of the preform 11 runs through a first end 23 and a second end 25 of the preform body 21, wherein the first end 23 of the preform body 21 is closed by a bottom 23 of the preform 11. The neck part 31 has a spout opening 35 and is connected to the second open end 25 of the preform body 21.

With the proposed preform 11, the maximum distance of the inside 17 of the preform wall 13 from the central axis 12 amounts to less than 3.5 or 3 or 2.5 millimeters for a length of the central axis 12 of at least 20, 30 or 50 millimeters. However, the dimensioning is not obligatory.

Additional advantageous features of the preform 11 include, as shown in FIG. 1, a thread 37 and a supporting ring 39 on the neck part 31. The thread 37 allows later application of a cover (not shown) to the spout opening of the plastic container to be provided from the preform 11. The support ring 39 facilitates the handling of the preform 11 which is provided in particular in the case of a two-stage injection stretch blow molding process (two-step injection stretch blow molding process) such as that provided for production of the preform 11 and the plastic container (from the preform), which brings advantages. In such a two-stage process, the preform 11 is cooled to room temperature after being produced and then is processed further in a stretch blow molding process to form a plastic container only at a later point in time. The preform 11 is produced in one piece by injection molding from a polyester, and this is also true of the thread 37 and the supporting ring 39, which are arranged on the outside 15 of the wall 13 of the preform 11. Like the preform body 21, the neck part 31 also has a first end 33 and a second end 35, wherein the first end 33 of the neck part 31 is connected to the second end 25 of the preform body 21, and the second end 35 of the neck part 31 has the spout opening. The latter leads into the interior space 19 of the hollow preform 11, wherein the interior space 19 extends from the spout opening to the bottom of the preform 11. The interior space 19 is bordered by the inside 17 (i.e., the inner surface) of the wall 13, which also has an outside 15 (i.e., an outer surface). The distance between the inside 17 and the outside 15 is the wall thickness. This may optionally be greater on the average in the area of the preform body 21 than in the area of the neck part 31, wherein structures on the outside 15 of the wall 13 such as the thread 37 and the supporting ring 39 are to be disregarded in evaluating the wall thickness. Normally in production of a plastic container from a preform 11, namely only the preform body 21 is stretched and blow molded, which is why more material is needed in this area. The interior space 19 may optionally have a larger cross section in the area of the neck part 31 than in the area of the preform body 21, wherein the cross section is understood to refer to the cross-sectional area at a right angle to the central axis 12. The central axis 12 of the preform 11 runs from the spout opening to the bottom, wherein it is essentially the same distance from opposing points on the inside 17 opposite one another with respect to the central axis 12, i.e., running essentially at the center of the interior space 9. In the area of the preform body 21 connected to the neck part 31, the interior space 19 may optionally taper, wherein it reaches its smallest cross section in the area 27 of the bottom 23 of the preform 11. The inside 17 of the wall 13 in the area 27 just described is at a maximum distance of 3.5 millimeters from the central axis 12, wherein this area is adjacent to the bottom 23 of the preform 11 and is at least 30 millimeters long.

FIGS. 3a and 3b show, on the basis of the prior art, the problems in production of a plastic container from a preform 11 according to FIG. 1, which has a preform body with a small cross section.

In the known stretch blow molding process, it is provided that the stretching mandrel 51 does not come in contact with the preform 11 during the insertion of the stretching mandrel into the preform 11 until reaching the bottom thereof. FIG. 3a illustrates this desired situation, where it is shown that the stretching mandrel 51 is not in contact with the preform 11 except at its tip.

In contrast with that FIG. 3b illustrates the situation when the stretching mandrel 51 is inserted incorrectly, in which a lateral contact of the preform 11 leads to local cooling of same at the point of contact. The introduction starting on page 1 of this document explains how such a situation may come about and what the consequences are.

FIG. 2 shows an inventive embodiment variant in which the stretching mandrel 51, while it is being inserted into the preform 11 and before it reaches the bottom 23 (cf. FIG. 1) of the preform 11, comes in contact with the inside 17 (cf. FIG. 1) of the preform 11 in the area of the preform body 21 at several locations (such as at regular intervals) along its circumference or continuously along its circumference. This leads to a more uniform influence on the preform temperature and prevents the problems associated with FIG. 3b.

It can be seen on the basis of FIG. 1 that the preform body 21 extends along a central axis 12 of the preform 11, and the preform 11 has a wall 13 bordering an interior space 19 of the preform 11 and having an inside 17 and an outside 15. The stretching mandrel 11 extends along a central axis 52 of the stretching mandrel, wherein in the ideal case the central axis of the stretching mandrel essentially corresponds to the central axis 12 of the preform 11 during insertion into the preform 11.

Within an area 49 connected to the tip of stretching mandrel 51, the extent of the stretching mandrel 51 at a right angle to the central axis 52 of the stretching mandrel 51 is at least as large as the extent of the interior space of the preform 11 at a right angle to the central axis 12 of the preform 11 within an area 29 connected to the bottom of the preform 11. It is possible that this is true of the area 49 of the stretching mandrel and/or the area 29 of the preform over its entire length or only for one, two or more locations along the aforementioned areas 29, 49. The two aforementioned areas 29, 49 are not necessarily equal in length. It may be advantageous if said areas 29, 49 have a length of at least 5, 10 or 20 millimeters and/or at most 100, 80 or 70 millimeters. Unless otherwise indicated, directional information about the areas 29, 49 is based on a direction parallel to the respective central axis 12, 52. The area 29 described for the preform may correspond to the area 27 with a small cross section according to FIG. 1.

Due to the fact that the stretching mandrel may be designed to be thicker in relation to the dimensioning of the preform body, stretching mandrels of a sufficient stability may also be used for further processing of preforms with a small inside diameter.

Figure 4:
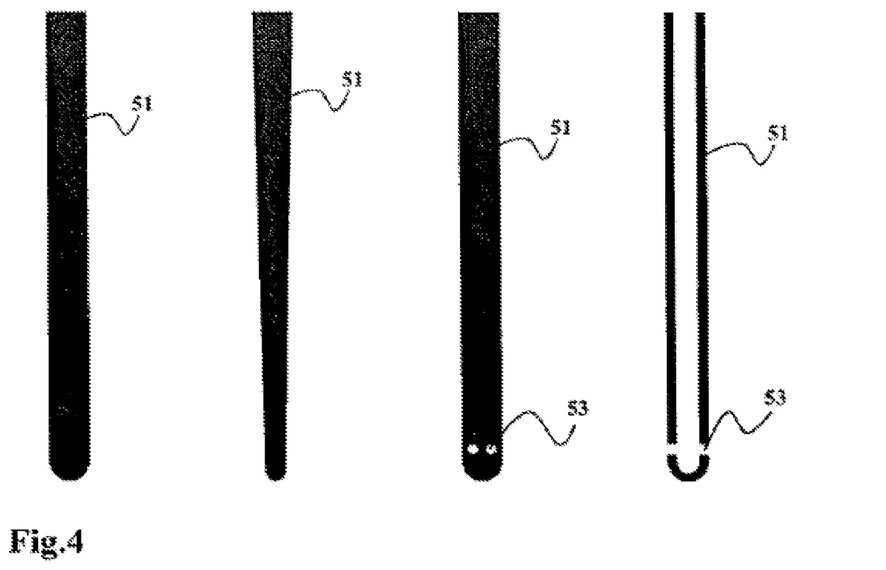
FIG. 4 shows various types of stretching mandrels.

FIG. 4 shows various types of stretching mandrels. The first stretching mandrel 51 from the left has a cylindrical stretching mandrel body while the second stretching mandrel 51 has a conical stretching mandrel body. The third and fourth illustrations show the same stretching mandrel 51, once in a side view and once in a sectional view along the central axis. This third variant of a stretching mandrel 51 is hollow on the inside and has openings 53 at the tip of the stretching mandrel leading into the hollow cavity. In the (main) blowing and/or in the optional preliminary blowing, the fluid can be introduced into the preform through the cavity and the openings 53.

It can be stated in general that suitable stretching mandrels 51 have a cross section (section at a right angle to the central axis of the stretching mandrel) or a (exterior) circumference of the stretching mandrel 51 such as that defined in the description, which may be round, oval or even polygonal (regular or irregular) with at least four, five or six corners, for example. It is also possible for the aforementioned cross section or circumference to have outwardly facing corners (away from the central axis) and/or inwardly facing corners (toward the central axis) and/or rounded edges. For example, said cross section or circumference may have a flower shape or the stretching mandrel 51 may have webs such as those mentioned in the description.

The invention claimed is:

1. A stretch blow molding process for producing a plastic container from a preform, comprising:
   providing a preform having an elongated tubular preform body, which extends along a central axis of the preform and has a first end and a second end essentially opposite the first end, wherein the first end is closed by a bottom of the preform and a neck part with a spout opening is connected to the second end, and having a wall bordering an interior space of the preform and having an inside and an outside;
   heating the body of the preform to at least 70° C.;
   inserting the preform into a cavity in a blow molding mold;
   inserting a stretching mandrel comprising a stretching mandrel body and a stretching mandrel tip into the preform until the stretching mandrel tip reaches the preform body, the stretching mandrel in the form of an essentially continuous cylinder having a substantially constant diameter from the stretching mandrel tip to at least up to the spout opening of the preform when stretched;
   stretching the body of the preform and the bottom of the preform with the stretching mandrel in the cavity,
   shaping the preform body and the bottom of the preform according to the cavity by introducing a fluid into the preform under pressure; and
   contacting an inside of the wall in an area of the preform body in at least one predetermined partial area with the stretching mandrel, while it is being inserted into the preform, until it reaches the bottom of the preform, the stretching mandrel coming into contact with at least 30% of an inside of the wall in an area of the body of the preform when the stretching mandrel reaches the bottom of the preform.

2. The stretch blow molding process of claim 1, wherein the stretching mandrel body comprises an outside with an exterior contour, so that the inside of the wall of the preform is contacted by the outside of the stretching mandrel body on at least two partial areas extending essentially along the central axis of the preform, so that they are essentially opposite one another with respect to the central axis of the preform, while the stretching mandrel is being inserted into the preform.

3. The stretch blow molding process of claim 2, wherein the stretching mandrel body comprises at least one groove extending essentially as far as the tip of the stretching mandrel or into the tip of the stretching mandrel, the at least one groove configured so that the fluid can be introduced from the spout opening in the preform up to the bottom of the preform when the stretching mandrel has stretched the preform body and the bottom of the preform into the cavity as far as an inside wall of the cavity.

4. The stretch blow molding process of claim 1, wherein, the stretching mandrel extends along a central axis of the stretching mandrel, an extent of the stretching mandrel body at a right angle to the central axis of the stretching mandrel is at least as large in an area adjacent to the stretching mandrel tip as is the extent of the interior space of the preform at a right angle to the central axis of the preform in an area of the body of the preform connected to the bottom of the preform body in an unstretched state of the preform body, and the extent of the interior space is less than 7 millimeters.

5. The stretch blow molding process of claim 1, wherein the stretching mandrel, while being inserted into the preform, widens the preform body.

6. The stretch blow molding process of claim 1, wherein before the stretching mandrel is inserted into the preform, the inside of the wall has a temperature at least 10° C. higher in an area of the preform body than the outside of the wall in the area of the preform body, wherein the inside of the wall in the area of the preform body is at a temperature of at least 100° C.

7. The stretch blow molding process of claim 1, wherein the preform body before being heated is at a temperature of less than 40° C.

8. The stretch blow molding process of claim 1, wherein the stretching mandrel comprises at least one of a heat-insulating layer or an adhesion-reducing layer on an outside thereof.

9. The stretch blow molding process of claim 1, wherein an outside of the stretching mandrel or the inside of the wall of the preform comprises a plurality of webs running in an area of the preform body along an insertion direction, establishing contact between the stretching mandrel and the preform during insertion of the stretching mandrel.

10. The stretch blow molding process of claim 1, wherein the fluid is inserted through the tip of the stretching mandrel.

11. The stretch blow molding process of claim 1, wherein the stretching mandrel is heated outside of the blow molding mold before insertion into the preform.

12. The stretch blow molding process of claim 1, wherein the tip of the stretching mandrel travels a distance between 20 and 200 millimeters while the preform body and the bottom of the preform are being stretched into the cavity by the stretching mandrel.

13. The stretch blow molding process of claim 4, wherein an extent of the interior space is less than 6 millimeters.

14. The stretch blow molding process of claim 4, wherein an extent of the interior space is less than 5 millimeters.

15. The stretch blow molding process of claim 4, wherein an extent of the interior space is less than 3 to 4 millimeters.

16. A stretch blow molding process for producing a plastic container from a preform, comprising:
    providing a preform having an elongated tubular preform body, which extends along a central axis of the preform and has a first end and a second end essentially opposite the first end, wherein the first end is closed by a bottom of the preform and a neck part with a spout opening is connected to the second end, and having a wall bordering an interior space of the preform and having an inside and an outside;
    heating the body of the preform to at least 70° C.;
    inserting the preform into a cavity in a blow molding mold;
    heating a stretching mandrel comprising a stretching mandrel body and a stretching mandrel tip outside of the blow molding mold before insertion into the preform
    inserting the stretching mandrel into the preform until the stretching mandrel tip reaches the preform body;
    stretching the body of the preform and the bottom of the preform with the stretching mandrel in the cavity,
    shaping the preform body and the bottom of the preform according to the cavity by introducing a fluid into the preform under pressure;
    contacting an inside of the wall in an area of the preform body in at least one predetermined partial area with the stretching mandrel, while it is being inserted into the preform, until it reaches the bottom of the preform.

17. The stretch blow molding process of claim 16, wherein the stretching mandrel body comprises an outside with an exterior contour, so that the inside of the wall of the preform is contacted by the outside of the stretching mandrel body on at least two partial areas extending essentially along the central axis of the preform, so that they are essentially opposite one another with respect to the central axis of the preform, while the stretching mandrel is being inserted into the preform.

18. The stretch blow molding process of claim 17, wherein the stretching mandrel body comprises at least one groove extending essentially as far as the tip of the stretching mandrel or into the tip of the stretching mandrel, the at least one groove configured so that the fluid can be introduced from the spout opening in the preform up to the bottom of the preform when the stretching mandrel has stretched the preform body and the bottom of the preform into the cavity as far as an inside wall of the cavity.

19. The stretch blow molding process of claim 16, wherein,
    the stretching mandrel extends along a central axis of the stretching mandrel, an extent of the stretching mandrel body at a right angle to the central axis of the stretching mandrel is at least as large in an area adjacent to the stretching mandrel tip as is the extent of the interior space of the preform at a right angle to the central axis of the preform in an area of the body of the preform connected to the bottom of the preform body in an unstretched state of the preform body, and
    the extent of the interior space is less than 7 millimeters.

20. The stretch blow molding process of claim 16, wherein the stretching mandrel, while being inserted into the preform, widens the preform body.

21. The stretch blow molding process of claim 16, wherein before the stretching mandrel is inserted into the preform, the inside of the wall has a temperature at least 10° C. higher in an area of the preform body than the outside of the wall in the area of the preform body, wherein the inside of the wall in the area of the preform body is at a temperature of at least 100° C.

22. The stretch blow molding process of claim 16, wherein the preform body before being heated is at a temperature of less than 40° C.

23. The stretch blow molding process of claim 16, wherein the stretching mandrel comprises at least one of a heat-insulating layer or an adhesion-reducing layer on an outside thereof.

24. The stretch blow molding process of claim 16, wherein an outside of the stretching mandrel or the inside of the wall of the preform comprises a plurality of webs running in an area of the preform body along an insertion direction, establishing contact between the stretching mandrel and the preform during insertion of the stretching mandrel.

25. The stretch blow molding process of claim 16, wherein the fluid is inserted through the tip of the stretching mandrel.

* * * * *